United States Patent
Teasley

(10) Patent No.: US 7,532,112 B2
(45) Date of Patent: May 12, 2009

(54) LOCATION-BASED INFORMATION DELIVERY SYSTEM FOR PEDESTRIAN USE

(75) Inventor: Brian L. Teasley, 300 Mercer St., #27L, New York City, NY (US) 10003

(73) Assignee: Brian L. Teasley, New York, NY (US)

( * ) Notice: Subject to any disclaimer, the term of this patent is extended or adjusted under 35 U.S.C. 154(b) by 325 days.

(21) Appl. No.: 11/559,258

(22) Filed: Nov. 13, 2006

(65) Prior Publication Data

US 2008/0114536 A1    May 15, 2008

(51) Int. Cl.
*G08B 1/08* (2006.01)
(52) U.S. Cl. .............. 340/539.11; 340/539.13; 340/572.1; 340/572.4; 340/572.7; 340/573.1; 340/573.4; 340/825.49; 235/375; 235/462.46
(58) Field of Classification Search ............ 340/539.11, 340/539.13, 572.1, 572.4, 572.7, 573.1, 573.4, 340/825.49; 235/375, 462.46
See application file for complete search history.

(56) References Cited

U.S. PATENT DOCUMENTS

| | | | |
|---|---|---|---|
| 5,717,392 A | 2/1998 | Eldrige | |
| 5,767,795 A | 6/1998 | Schaphorst | |
| 6,085,148 A | 7/2000 | Jamison et al. | |
| 6,199,045 B1 | 3/2001 | Giniger et al. | |
| 6,266,614 B1 | 7/2001 | Alumbaugh | |
| 6,360,167 B1 | 3/2002 | Millington et al. | |
| 6,552,682 B1 | 4/2003 | Fan | |
| 6,992,592 B2 * | 1/2006 | Gilfix et al. | 340/825.19 |
| 7,124,024 B1 | 10/2006 | Adelaide et al. | |
| 7,130,742 B2 | 10/2006 | Kobuy et al. | |
| 2007/0296572 A1 * | 12/2007 | Fein et al. | 340/539.13 |

* cited by examiner

*Primary Examiner*—Tai T Nguyen

(57) ABSTRACT

A location-based multi-media information delivery system and control for pedestrian use is disclosed, designed especially for use in areas where it is not possible to determine a user's precise location. The system automatically provides a selection list of relevant information based on the user's calculated location. The system then delivers information via the appropriate output method, based on the user's selection. Also disclosed is a system that receives location information from various systems, including global positioning satellite systems and wireless local area network systems. The system may provide video, audio and visual information.

6 Claims, 6 Drawing Sheets

LOCATION-BASED INFORMATION DELIVERY SYSTEM FOR PEDESTRIAN USE

FIELD OF INVENTION

This invention relates to a mobile location-based information delivery system, specifically for use by pedestrians. The present invention embodies a system that will operate in areas where determining a user's precise location is not possible and his calculated location is not completely accurate.

BACKGROUND OF THE INVENTION

Mobile information delivery systems that deliver information based on a user's location are common. Examples can be found in museums and in vehicles.

One such system delivers audio and/or visual information when a user enters an identification number into the system. Examples of this type of system can be found in museums around the world. A museum visitor sees an art object in which he would like more information, and enters the object's corresponding identification number, which is usually found on the wall or display near the object, into the audio guide device.

A deficiency of this type of system is that it requires the visible placement and display of an appropriate identification number for each piece of information. This is generally not feasible for many applications—especially for use in outdoor areas, including parks and city streets.

Another system found in both museums and trade-shows delivers information when a user enters a specifically identified area, delineated by some type of trigger mechanism such as an infra-red beam or a signal triangulated from a wireless local area computer network.

A deficiency of this type of system is that it requires the establishment of the physical trigger mechanism.

Another type of location based information deliver system is one in which a user tunes a radio to a specific frequency to receive the information. The user is visually informed of the availability of the information by a posted sign of some type.

Among the deficiencies of this type of system are that it again requires a visible display of the radio frequency and the user must be carrying an appropriate radio.

Location-based information delivery systems for use in vehicles are another example of mobile information deliver systems that deliver information based on a user's location. Such information deliver systems include digital map displays found in many automobiles. Such systems also include vehicle-based gps tour systems which deliver information related to a user's location—and potentially their velocity and/or direction of travel and/or visual orientation. The driver may (but is not required) to input relevant information such as intended destination and/or type of information requested, and the program delivers relevant information during the vehicle's trip. In these systems information is delivered for presentation automatically when the user comes within a prescribed distance of a point-of-interest. These systems provide the information in a useful and appropriate manner.

These vehicle-based information delivery systems have some deficiencies. For pedestrian use, such a system requires that accurate location information be delivered to the control program. This often does not happen in a pedestrian situation, especially in an obstructed area where the global positioning satellite signals do not always provide an accurate reading of the user's location. A pedestrian walking in an urban environment will often encounter this problem, with his calculated location being near, but not exactly his actual position.

Another problem with such a system that incorporates the use of velocity, direction of travel, or visual orientation is that this information may not be available to the system. A system that relies on global positioning satellites, when used in a pedestrian application, may not have accurate data regarding any of these pieces of information since the low speed of travel combined with inherent error in location information delivered by global position satellites or other such systems frequently renders the calculation of velocity and direction of travel impossible.

A system that relies on visual orientation or automatic delivery of information has the short-coming that there may be multiple pieces of information related to the visual orientation of the user and the user may only want to listen to some subset, or none, on the information. Systems described in prior art that do not incorporate visual orientation also have this deficiency.

Another deficiency of a vehicle-based mobile information that uses automatic delivery of multi-media output is that the user may not be prepared to listen to the output, especially if the output device is a headphone apparatus.

A further deficiency of such a system is that it fall short of its' potential usefulness by failing to provide information about additional items that may be near the user, since the trigger only initiates one specific piece of information. There may be multiple items or locations of interest near the user that are in view and additional items of interest within a short distance of the user about which he should be informed. The user can listen to the information and/or travel to those additional locations.

SUMMARY OF THE INVENTION

The present invention has as its objectives solution of the above problems and provision of a mobile location-based information delivery system suitable for pedestrian use.

This system should be interfaceable with various position-determining systems, including global positioning satellite systems. The information should be displayable in a variety of multimedia formats, including audio, video, and static graphics including photographs.

A critical object of the present invention is the presentation of a selection of available and relevant information (i.e. information pertaining to "nearby" objects or locations) from which the user selects what it is he wants more information about. It is an object of the present invention to be able to deliver relevant information pertaining to a user's actual location even when the user's calculated location (as provided by the location delivery system, e.g. global positioning satellite system) is different from their actual location.

By providing a selection of locations in the vicinity of the user from which the user can chose the relevant information, the invention overcomes the deficiencies of the prior art. Specifically in regards to the accuracy of the user's calculated location, the critical object overcomes the problem by showing locations within the known accuracy of the location determination means at the calculated location. This assures that the information pertaining to the user's actual location will be presented on the selection list even though the calculated location may be different from the user's actual location. This allows the user to select the information that is relevant to him.

BRIEF DESCRIPTION OF THE DRAWINGS

The objects and features of the present invention are set forth in the appended claims. The present invention is best understood by reference to the following description while examing the accompanying drawings, of which:

DETAILED DESCRIPTION OF THE PREFERRED EMBODIMENTS

After reading the following description it should be apparent to those skilled in the arts how to implement the invention in various embodiments.

The present invention advantageously uses a listing of nearby points of interest presented to the user, in conjunction with a show radius parameter which helps to determine which points of interest should be presented to the user for selection, to allow for delivery of user desired information in area's where a user's actual location does not always precisely match that given by a location delivery system, such as one using a GPS system.

Although various embodiments of the present invention will be described herein, it is understood that these embodiments are presented by way of example only, and not limitation.

Figure 1:
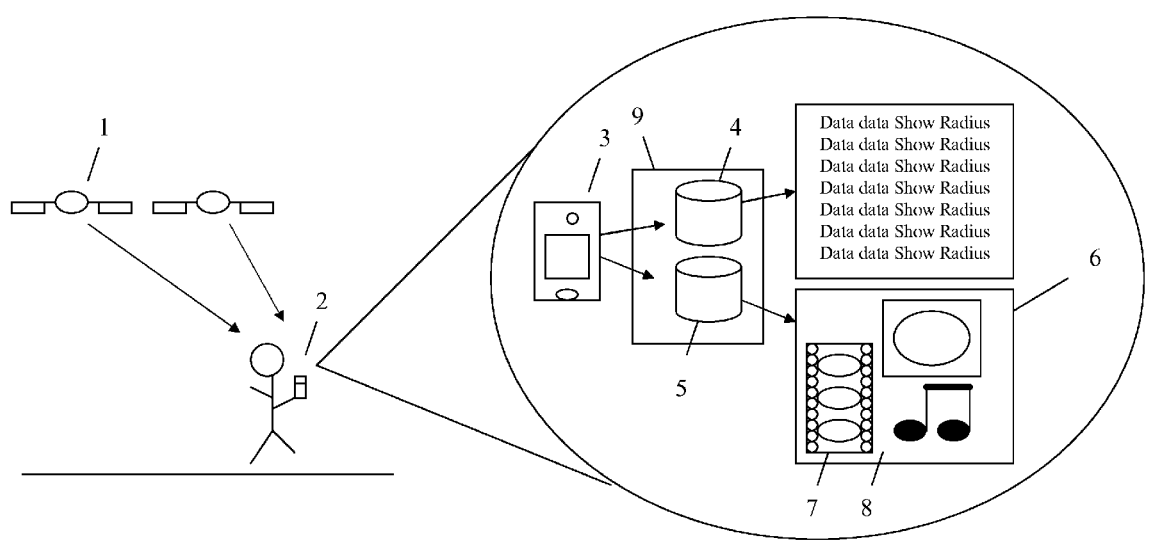
FIG. 1 is a depiction of the operation of one preferred embodiment of the present invention as it might be used by a pedestrian

FIG. 1 is a depiction of one preferred embodiment of the present invention as used by a pedestrian. The location determining means 1, exemplified by gps satellites, transmit location related information to a location receiving instrument 2. The control unit 3 uses the information from the location receiving instrument 2 to determine the user's location. The control unit then uses a database of point of interest information 4 to determine a list of relevant choices from which the user can make (or not make) a selection. The relevant choices are presented to the user through the visual display means in the presenting means 6. Based on the user's selection the control unit then delivers appropriate multi-media based information, including tourist information, directions, historic information, photographs, videos, advertisements and other information taken from the database of multimedia content 5. This delivery is accomplished through the presenting means 6—which could include audio speakers, a cathode ray tube monitor, a liquid crystal display, plasma display or other visual display means.

As further depicted in FIG. 1, the storage means 9 on which the multimedia information and the point of interest selection information is stored may comprise many different types of devices or systems. Flash memory, removable computer disks, read-only memory (ROM), random access memory (RAM) are all examples of types of appropriate storage mediums.

Figure 2:
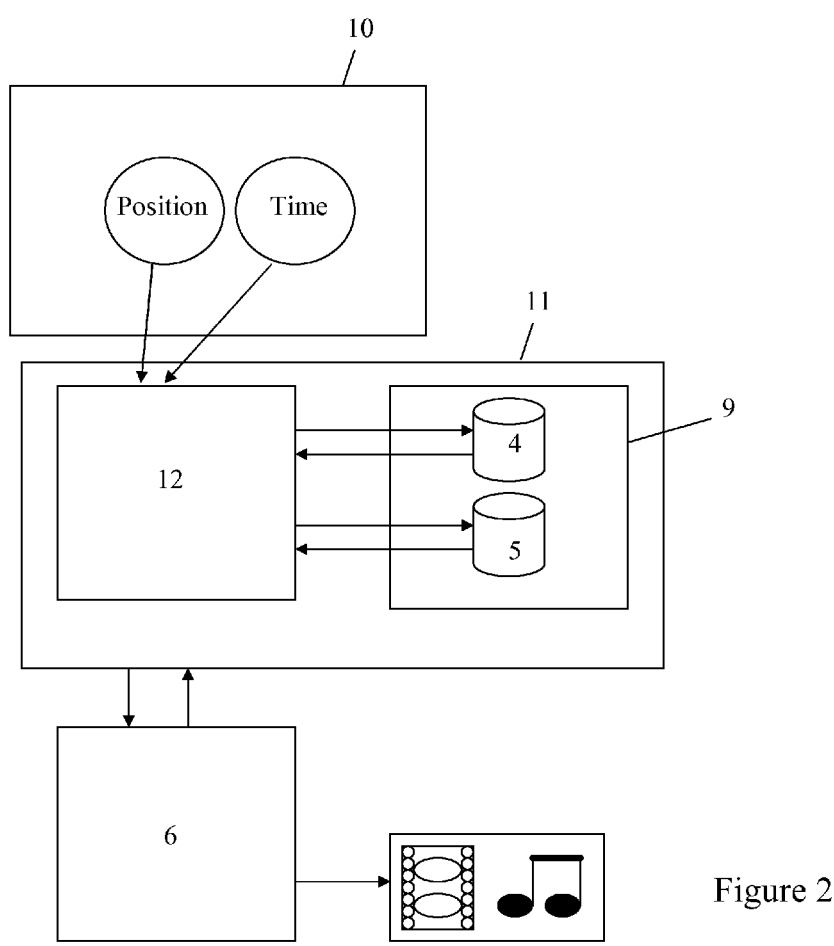
FIG. 2 is a functional diagram of the operation of one preferred embodiment of the present invention

FIG. 2 is a functional diagram of one preferred embodiment of the present invention. The programmable computer 11 contains the storage means 9 which contains the database of point of interest information 4 and multi-media information 5. The programmable computer also contains a control device 12. A control program, also stored on the storage means, is used by the control device uses the presenting means 6 to present a selection of relevant nearby points-of-interest to the user. The control device 12 accomplishes this by receiving inputs 10 and determining the user's calculated location and comparing the location against the information contained in the point of interest database. The specifics of this selection process are given in FIG. 3.

FIG. 2 further depicts the functionality by showing the accessing of the multi-media database 5. Once the selection of relevant point-of-interest information is presented to the user and a selection is made, the control device accesses the selected, relevant multimedia information 5 on the storage means 9 and that information is presented to the user via the presenting means 6.

Figure 3:
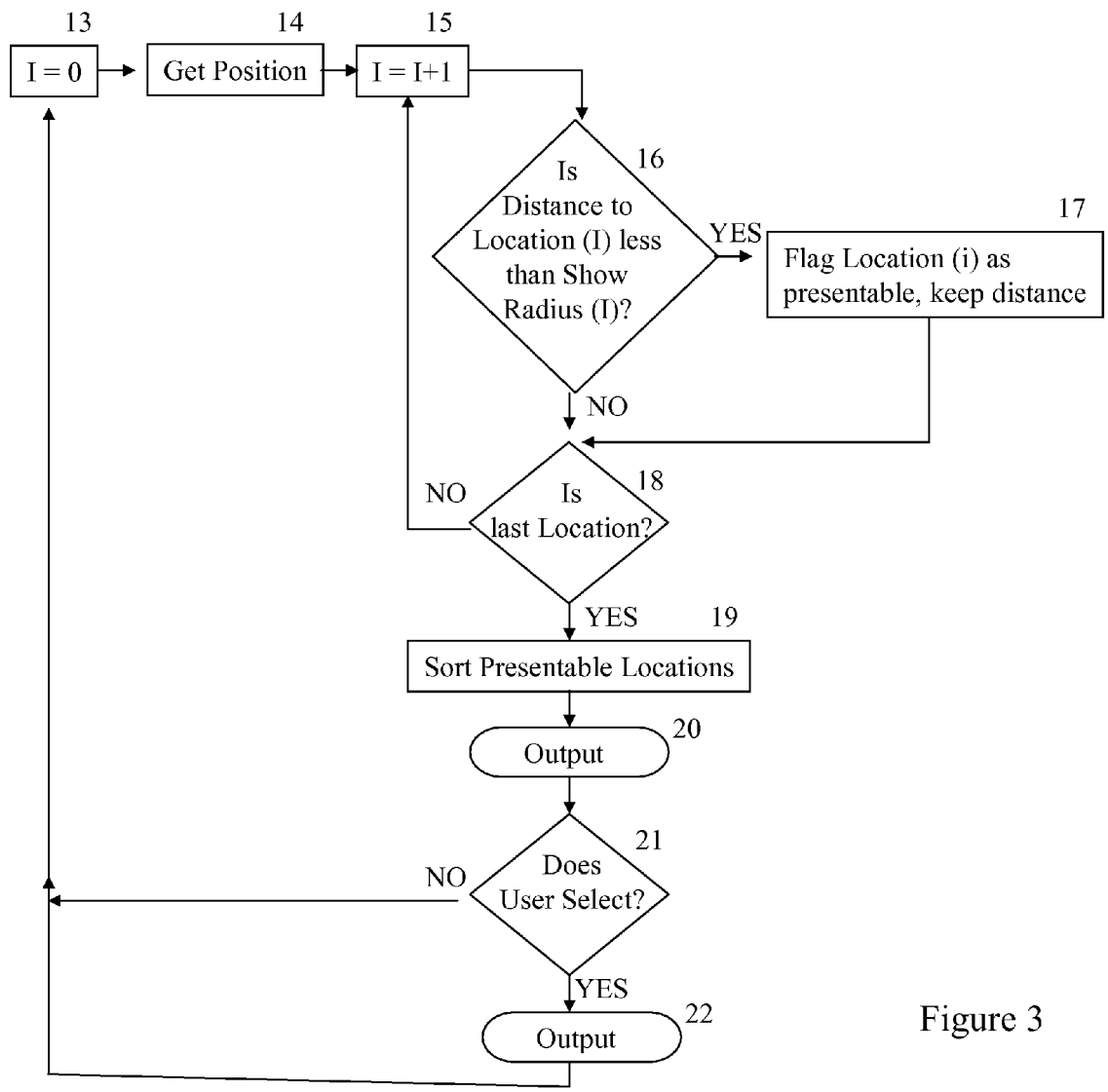
FIG. 3 is a flow diagram of the essential steps in the process of operating a control device of the present invention.

FIG. 3 is a flow chart of the essential steps of the process of operating a control device of the present invention. Beginning at step 13, a counter I is set to zero.

In step 14 the user's calculated location is determined. This is accomplished by the controller by obtaining the position information from the location receiving instrument and using mathematical calculations such as triangulation or trilateration to determine the user's calculated location.

Step 15 increments the counter I by 1.

Step 16 evaluates the distance from the calculated position from the location of each point of interest stored in the database 4. The condition checks to see if the distance to the location is less than the show radius for the location. If the condition is true, step 17 flags the location for presentation.

The condition in Step 18 checks to see if the last location has been analyzed. If the condition is not true, then the counter I is incremented again in step 15.

If the condition in Step 18 is true, Step 19 sorts the flagged locations by the distance from the user's calculated location.

Step 20 outputs the list of flagged and sorted locations to the presentation device.

The query step 21 evaluates if the user has made a selection from the presented locations.

If the user has made a selection then the appropriate information is retrieved from the database 5 and is output on the presentation device in step 22

If the user has not made a selection the process begins again at step 13.

The aforementioned process is only one example of the order of and components of the steps of the present invention. Other processes may be available that will perform the task of presenting relevant information to a pedestrian user.

Figure 4:
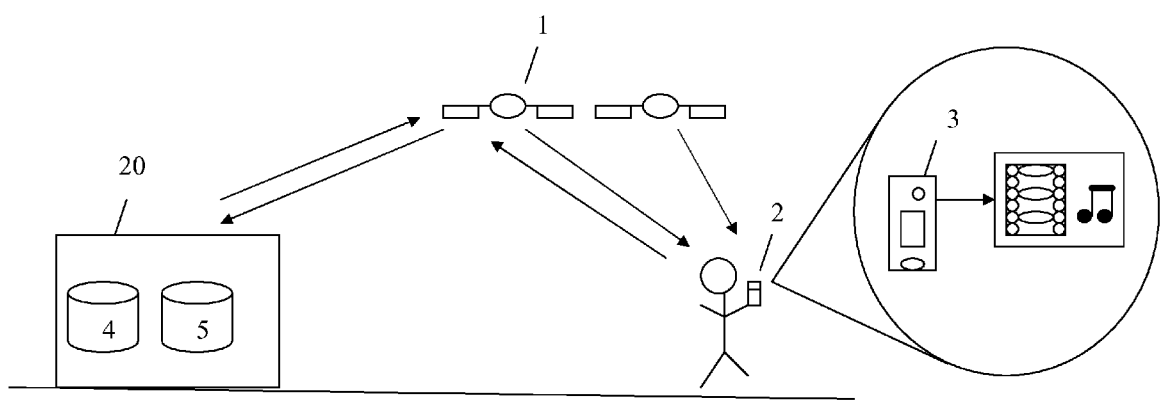
FIG. 4 is a depiction of the operation of an additional embodiment of the present invention.

FIG. 4 is a depiction of another embodiment of the present invention. In this embodiment the user's calculated location is determined as in the previous embodiment and is transmitted to a secondary computer and control program 20 in a location elsewhere than the user's location. The computer and control program 20 contain the storage device with the database of locations 4 and multi-media information 5. The calculations regarding and the tagging of relevant locations in the database of locations 4 are handled by the secondary computer and control program 20 and the results are transmitted to the user's computer and control device 3 for output on the presentation device 6. The user's selection is then transmitted back to the secondary control device 20 where the relevant multi-media information is retrieved from the storage device 5 and transmitted to the user's control device 3 for output on the presentation device 6.

Figure 5:
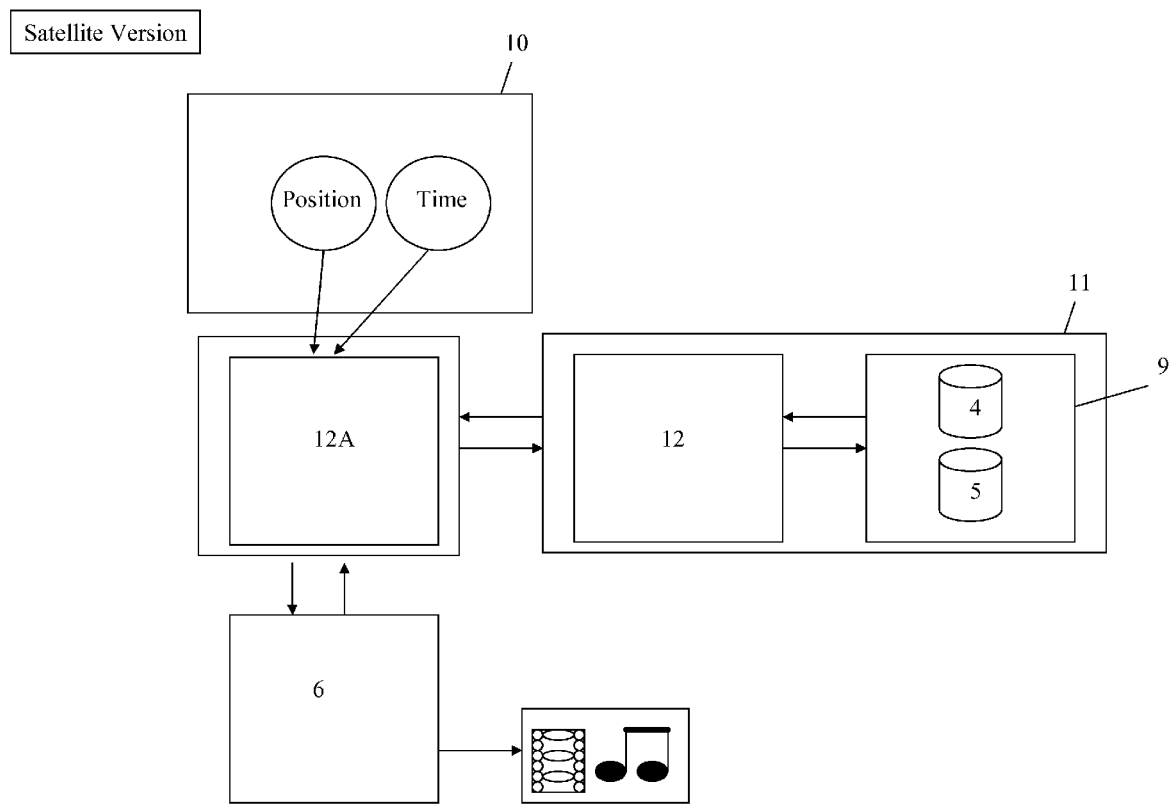
FIG. 5 is a functional diagram of the operation of this additional embodiment

FIG. 5 is a functional diagram of the operation of the embodiment shown in FIG. 4. In this embodiment the relevant locations selection list information and the multi-media information are retrieved from a secondary storage means in a second computer 11 and associated control device 12 in a location separate from the user's location. In this embodiment the control device in the user's location 12A calculates the user's location and transmits this information to the control device 12. The control device in the user's location 12A also transmits the user's selection to the control device 12. The control device 12 produces the selection list and provides the multi-media information, both of which are transmitted to the user's control device 12A

Figure 6:
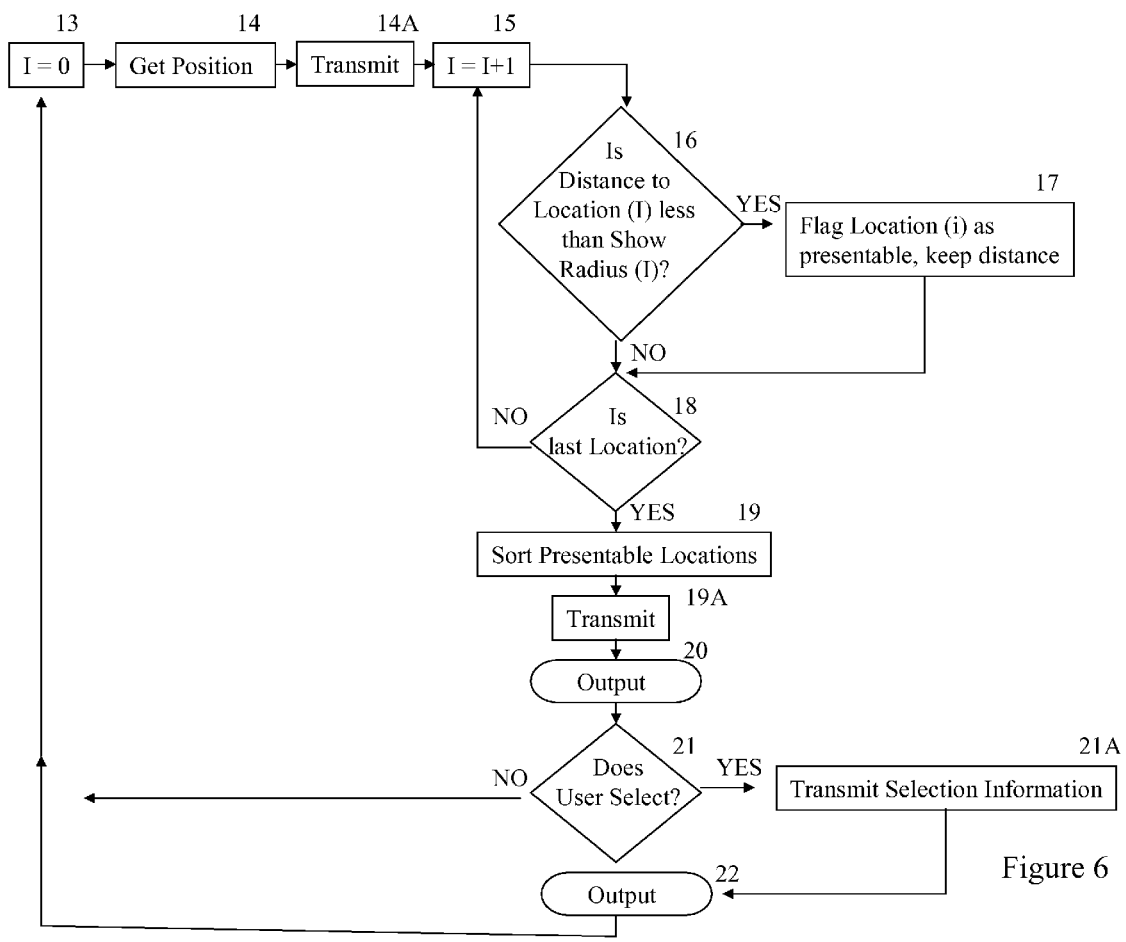
FIG. 6 is a flow diagram of the essential steps in the process of the additional embodiment

FIG. 6 is a flow diagram showing the essential steps necessary in the embodiment shown in FIG. 4. The steps are exactly as shown as in FIG. 3 with some minor additions which are as follows: In step 14A the user's location information is transmitted to the control program 20 at an "off site" computer. The control program then handles steps 15 through 19. In step 19A the presentable information selection list is transmitted to the user. In step 21A the user's selection is transmitted back to the control program 20 at the "off site" location and the appropriate multi-media information is returned via transmission. Step 22 then outputs to information via the user's presentation device.

What is claimed is:

1. An apparatus for presenting multimedia information to a pedestrian user, comprising:

position determining means for determining a location of the user; storage means for storing multimedia information to be presented to the user; selecting means, responsive to user location, for selecting relevant stored information from said storage means to be presented to the user as selection options, selection means responsive to user choice, for selecting stored multimedia information from said storage means to be presented to the user, wherein said the selecting means further includes:

calculating means for calculating a distance to each piece of information stored in storage means; tagging means for tagging stored multimedia information for retrieval, responsive to said calculating means; and retrieval means for retrieving information tagged by said tagging means from said storage means; and presenting means for presenting selection list of nearby information from which user selects, and for presenting multimedia information stored in said storage means and selected by said selecting means.

2. The apparatus of claim 1 wherein said presenting means comprises means for presenting audio information to the user.

3. The apparatus of claim 2 wherein said presenting means further comprises means for presenting visual information to the user.

4. A method of presenting multimedia information to a user, the method being implemented in a programmed computer system comprising a processor, a data storage system, at least one input device, and at least one output system, the method comprising the steps of:

receiving input data for the programmed computer, the data comprising calculated user position at a particular time;

storing the input data in the data storage system, wherein said input data comprise multimedia information to be presented to the user;

applying, to the input data stored in the data storage system, by means of the programmed computer, a step which compares the calculated user position to the positions of locations stored in the storage system; selecting by using the at least one input device, in responsive to user location, relevant stored data from said data storage system to be presented to the user, wherein said the selecting step further includes: calculating a distance to each piece of data stored in said storage system; tagging stored multimedia data for retrieval in responsive to said calculating step; and retrieving tagged data from said storage system; and presenting, by means of the output system, the selection of information on locations which are within the information's show radius distance from the user's calculated position.

5. The method of claim 4, wherein said receiving further comprises receiving input data comprising the directional heading of the user.

6. The method of claim 5, wherein said applying is further responsive to the directional heading of the user.

* * * * *